US005169224A

United States Patent [19]

Segoshi et al.

[11] Patent Number: 5,169,224

[45] Date of Patent: Dec. 8, 1992

[54] DISCHARGE HEAD LAMP ASSEMBLY

[75] Inventors: Toru Segoshi, Yokohama; Takashi Ashida, Zama, both of Japan

[73] Assignee: Nissan Motor Co., Ltd., Yokohama, Japan

[21] Appl. No.: 728,628

[22] Filed: Jul. 11, 1991

[30] Foreign Application Priority Data

Jul. 25, 1990 [JP] Japan .................................. 2-196915

[51] Int. Cl.[5] .......................... B60Q 1/00; F21V 9/00

[52] U.S. Cl. ....................................... 362/61; 362/256; 362/263; 362/293

[58] Field of Search ................. 362/61, 256, 263, 293, 362/310, 311, 351, 299, 301, 345, 373

[56] References Cited

U.S. PATENT DOCUMENTS

| | | | |
|---|---|---|---|
| 3,944,320 | 3/1976 | McLintic | 362/293 |
| 4,495,549 | 1/1985 | Carlson | 362/293 |
| 4,524,410 | 6/1985 | Kawakatsu et al. | 362/293 |
| 4,604,680 | 8/1986 | Levin et al. | 362/293 |
| 4,829,407 | 5/1989 | Bushell et al. | 362/293 |
| 4,985,816 | 1/1991 | Seko et al. | 362/61 |
| 5,021,930 | 6/1991 | Yamada | 362/61 |
| 5,047,903 | 9/1991 | Choji | 362/268 |

FOREIGN PATENT DOCUMENTS

| | | | |
|---|---|---|---|
| 877297 | 9/1961 | Fed. Rep. of Germany | 362/293 |
| 6480936 | 3/1964 | Japan | 362/299 |
| 61-181054 | 8/1966 | Japan | 362/298 |
| 0189802 | 7/1990 | Japan | 362/299 |

*Primary Examiner*—Ira S. Lazarus
*Assistant Examiner*—Y. Quach
*Attorney, Agent, or Firm*—Foley & Lardner

[57] ABSTRACT

In a discharge head lamp assembly for a vehicle, a lamp housing has a front face which is formed therein with an opening. A discharge lamp is arranged within the lamp housing. An inner lens is also arranged within the lamp housing at a location in front of the discharge lamp for converging a light from the discharge lamp. An outer lens made of a resinous material converges the opening in the front face of the housing. The outer lens transmits therethrough the light from the inner lens to guide the light to the outside. A reflecting film is formed on a face of the inner lens adjacent to the discharge lamp for reflecting ultraviolet rays from the dishcharge lamp.

5 Claims, 1 Drawing Sheet

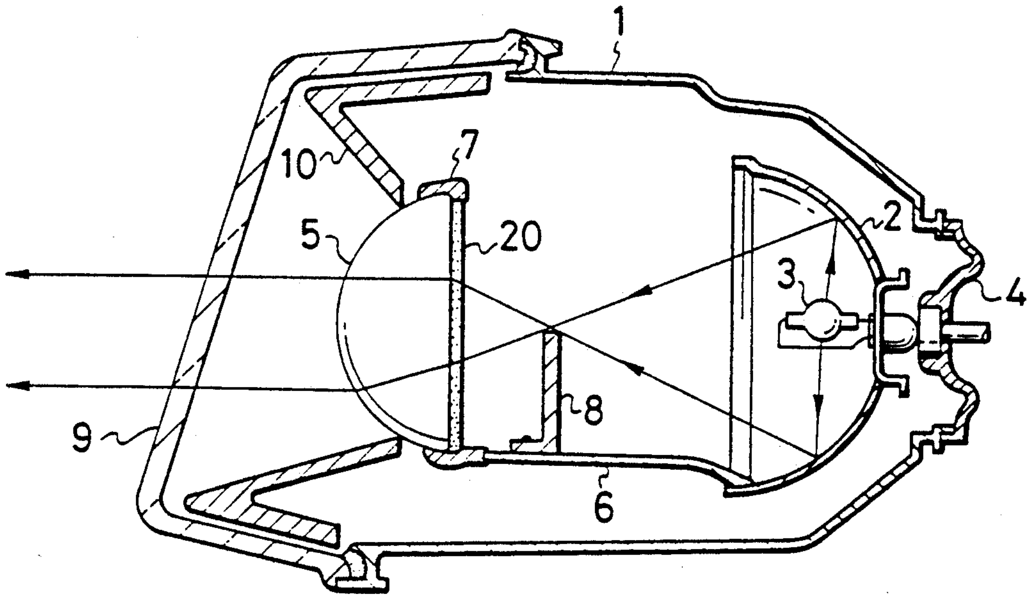
1
10
7
5
20
2
3
4
8
9
6

DISCHARGE HEAD LAMP ASSEMBLY

BACKGROUND OF THE INVENTION

The present invention relates to a discharge head lamp assembly of projector type for a vehicle.

A head lamp assembly of the kind referred to above comprises a lamp housing having a front face formed therein with an opening. A reflector and an electric discharge lamp are housed within the housing, and the discharge lamp is arranged substantially in a focus position of the reflector. An inner lens made of a glass material converges a light from the discharge lamp and the reflector to illuminate a location in front of a vehicle. A shade is arranged between the inner lens and the reflector. The opening in the front face of the lamp housing is covered with an outer lens. The outer lens is made of a resinous material in order than an attempt is made at lightening or reduction in weight. A location between an outer peripheral portion of the inner lens and a front face of the outer lens is covered with a blindfold inner panel or finisher, so that the interior of the housing cannot be seen from the outside through the outer lens.

Since the head lamp assembly constructed as described above uses the discharge lamp high in luminance and long in service life, an attempt can be made to reduce, in size, the lamp per se and to lengthen the service life thereof. Further, a shadow formed by the shade is projected toward a location in front of the inner lens, thereby making a cutline or a light-and-dark boundary definite. Thus, there is obtained a characteristic of a luminous intensity distribution of a (downward) dimmer beam in which there is substantially no upward leak light.

In the discharge head lamp assembly constructed as described above, however, a large quantity of ultraviolet rays is discharged from the discharge lamp. Although the ultraviolet rays can partially be removed or reflected by the glass inner lens, all the ultraviolet rays cannot be removed. Thus, there is a case where the resinous outer lens changes color or is discolored by the ultraviolet rays passed through the inner lens, and cracks occurs in the resinous outer lens by the ultraviolet rays transmitted through the inner lens.

SUMMARY OF THE INVENTION

It is an object of the invention to provide a discharge head lamp assembly for a vehicle, which is capable of preventing a bad influence due to ultraviolet rays by an inexpensive arrangement.

This and other objects can be achieved according to the present invention by providing a discharge head lamp assembly for a vehicle, comprising: a lamp housing having a front face formed therein with an opening; a discharge lamp arranged within the lamp housing: inner-lens means arranged within the lamp housing at a location in front of the discharge lamp for converging a light from the discharge lamp; outer-lens means made of a resinous material, the outer-lens means covering the opening in the front face of the housing, the outer-lens means transmitting therethrough the light from the inner-lens means to guide the light to the outside; and reflecting-film means formed on a face of the inner lens means adjacent to the discharge lamp for reflecting ultraviolet rays from the discharge lamp.

With the arrangement of the invention, since the reflecting-film means for reflecting the ultraviolet rays is formed on the face of the inner-lens means adjacent to the discharge lamp, the ultraviolet rays discharged from the discharge lamp do not reach the outer-lens means made of the resinous material. Thus, it is possible to prevent the outer-lens means from being changed in color by the ultraviolet rays, and to prevent cracks from being developed or formed in the outer-lens means by the ultraviolet rays.

BRIEF DESCRIPTION OF THE DRAWING

The FIGURE is a cross-sectional view of a discharge head lamp assembly for a vehicle, according to an embodiment of the invention.

DETAILED DESCRIPTION

Referring to the FIGURE, there is shown in discharge head lamp assembly for a vehicle, according to the invention. The discharge head lamp assembly comprises a lamp housing 1 having a front face which is formed therein with an opening. A reflector 2 in the form of a paraboloid of revolution is arranged within the lamp housing 1 at a location adjacent to a rearward end thereof. An electric discharge lamp 3 assembled together with the reflector 2 is arranged substantially in a focus position of the reflector 2. The reflector 2 including the discharge lamp 3 is mounted to the rearward end of the lamp housing 1 by a support element 4.

An inner lens 5 preferably made of a glass material, which converges a light from the discharge lamp 3 and the reflector 2, is arranged at the opening in the front face of the lamp housing 1 such that an optical axis of the inner lens 5 is in agreement with that of the reflector 2. The inner lens 5 has a convex front face remote from the discharge lamp 2 and a substantially flat or planar rear face adjacent to the discharge lamp 3. The inner lens 5 is connected to the reflector 2 through a distance retaining element or a spacer 6, and is mounted to a lens holder 7 which is supported by the lamp housing 1. Further, a metallic membrane or film 20 for reflecting ultraviolet rays from the reflector 2 and the discharge lamp 3 is vaporized or vacuum-deposited on the rear face of the inner lens 5. The metallic film 20 is a multilayer film which is so formed as to reflect only a light of a certain specific wavelength, that is, ultraviolet rays. The metallic film 20 is made of, for example, oxide such us titanium oxide TiO, sulfide such as zinc sulfide ZnS, or fluoride such as magnesium fluoride $MgF_2$.

A shade 8 is arranged between the reflector 2 and the inner lens 5 such that the light irradiated from the discharge lamp 3 obtains a definite cut-line or light-and-dark boundary. The shade 8 is mounted on the spacer 6. Furthermore, an outer lens 9 made of a resinous material is mounted on the opening in the front face of the housing 1 so as to close or hermetically seal the interior of the housing 1. A blindfold inner panel or finisher 10 is supported by the front end of the lamp housing 1 by means of a support element (not shown) so as to cover the outer circumference of the inner lens 5.

In the discharge head lamp assembly constructed as described above, the light irradiated from the discharge lamp 3 is directly directed toward the inner lens 5 or is reflected by the reflector 2, and the definite cut-line is given to the light by the shade 8. Subsequently, the light is passed sequentially through the inner lens 5 and the outer lens 9 and is irradiated toward a location in front of the discharge head lamp assembly. Since the metallic film 20 formed on the rear face of the inner lens 5 is so constituted as to reflect only the ultraviolet rays, the irradiated light is not obstructed by the metallic film 20.

Moreover, at this time, although the ultraviolet rays are discharged from the discharge lamp 3 as described previously, the ultraviolet rays are reflected by the metallic film 20 formed on the rear face of the inner lens 5 adjacent to the discharge lamp 3 so that the ultraviolet rays do not reach the outer lens 9. Accordingly, it is possible to prevent the outer lens 9 made of the resinous material from being changed in color or from being discolored by the ultraviolet rays, or it is possible to prevent cracks from being formed in the outer lens 9 by the ultraviolet rays. Further, it is assumed that the metallic film 20 is formed on the inner face of the outer lens 9. Then, an area of the inner face of the outer lens 9, on which the metallic film 20 is to be formed, is relatively large. In the embodiment of the invention, the metallic film 20 is formed on the rear face of the inner lens 5, that is, is formed only in the limited or narrow range. Thus, it is possible to prevent the cost from considerably increasing.

It has been described that the metallic film 20 is the multi-layer film. However, the metallic film 20 may be a single-layer film if there can be produced similar advantages. Furthermore, the film 20 may be a film other than metal.

What is claimed is:

1. A discharge head lamp assembly for a vehicle, comprising:

a lamp housing having a front face formed therein with an opening;

a discharge lamp arranged within said lamp housing;

inner-lens means arranged within said lamp housing at a location in front of said discharge lamp for converging a light from said discharge lamp;

outer-lens means made of a resinous material, said outer-lens means covering said opening in the front face of said lamp housing, said outer-lens means transmitting therethrough the light from said inner-lens means to guide the light to the outside; and reflecting-film means formed on a face of said inner lens means adjacent to said discharge lamp for reflecting ultraviolet rays from said discharge lamp, whereby discoloration and cracking of the outer lens means by ultraviolet rays are prevented.

2. A discharge head lamp assembly according to claim 1, wherein said reflecting-film means includes a metallic film.

3. A discharge head lamp assembly according to claim 1, wherein said reflecting-film means includes a multi-layer film.

4. A discharge head lamp assembly according to claim 1, wherein said reflecting-film means includes a single-layer film.

5. A discharge head lamp assembly according to claim 1, wherein said inner-lens means is made of a glass material.

* * * * *